US006310873B1

(12) United States Patent
Rainis et al.

(10) Patent No.: US 6,310,873 B1
(45) Date of Patent: Oct. 30, 2001

(54) INTERNET TELEPHONY DIRECTORY SERVER

(75) Inventors: Robert Rainis, Watertown; Stephen Ng, Arlington, both of MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/780,888

(22) Filed: Jan. 9, 1997

(51) Int. Cl.$^7$ .................................................. H04L 12/64

(52) U.S. Cl. .......................................... 370/356; 370/352

(58) Field of Search ..................................... 370/352, 353, 370/356, 401; 379/88.17, 90.01, 93.01, 93.07, 111, 112, 113, 114, 130, 133

(56) References Cited

U.S. PATENT DOCUMENTS

| | | |
|---|---|---|
| 4,796,293 | 1/1989 | Blinken et al. . |
| 5,012,466 | 4/1991 | Buhrke et al. . |
| 5,351,286 | 9/1994 | Nici . |
| 5,392,344 | 2/1995 | Ash et al. . |
| 5,392,402 | 2/1995 | Robrock, II . |
| 5,406,555 | 4/1995 | Yoshida . |
| 5,406,557 | 4/1995 | Baudoin . |
| 5,469,500 | 11/1995 | Satter et al. . |
| 5,500,889 | 3/1996 | Baker et al. . |
| 5,509,058 | 4/1996 | Sestak et al. . |
| 5,526,489 | 6/1996 | Nilakantan et al. . |
| 5,530,740 | 6/1996 | Irribarren et al. . |
| 5,751,706 * | 5/1998 | Land et al. ............................ 370/352 |

OTHER PUBLICATIONS

Newton, H., "Telephony Messaging On The Internet," *Computer Telephony*, Jul. 1996, pp. 10–16.

Mills, M., "Phone Service Via The Internet May Slash Rates," *The Washington Post*, Aug. 11, 1996, p. A4.

Hughes, D., "WebPhone Heading For Serious Telephony," *The Fairfax Journal*, May 28, 1996, p. A8.

Venditto, G., "Internet Phones, The Future Is Calling," *Internet World*, Jun. 1996, pp. 40–52.

Sullivan, K., "Vendors Address Net Telephony Weaknesses," *PC Week*, Oct. 14, 1996, vol. 13, No. 41, p. 119.

Hill, J. et al., "Real–Time Communication," *PC Magazine*, Oct. 8, 1996.

Berlind, D., "Making Short Work Of Long Distance," *PC Week*.

Kosiur, D., "Cutting Through Telebaloney,"*PC Week*, Sep. 20, 1996.

Sullivan, K., "Videoconferencing Arrives On The Internet," *PC Week*.

Korzeniowski, P., "Novell's Telephony Plan At Sink–Or-–Swim Juncture," *PC Week*, Mar. 25, 1996.

* cited by examiner

*Primary Examiner*—Huy D. Vu
(74) *Attorney, Agent, or Firm*—Mintz Levin Cohn Ferris Glovsky and Popeo, PC

(57) ABSTRACT

The invention relates to a system that provides telephonic communication over the Internet, and more particularly relates to an Internet telephony system that allows the user to select a service to handle the call, to choose a method of payment, and to call a party by ringing the party's standard telephone. When the user desires to place a call, the user receives rate quotes from candidate telephony servers and selects a telephony server, which connects the call to the receiving party's standard telephone. The selected telephony server handles payment for the call and provides the user with information regarding progress and cost of the call.

55 Claims, 4 Drawing Sheets

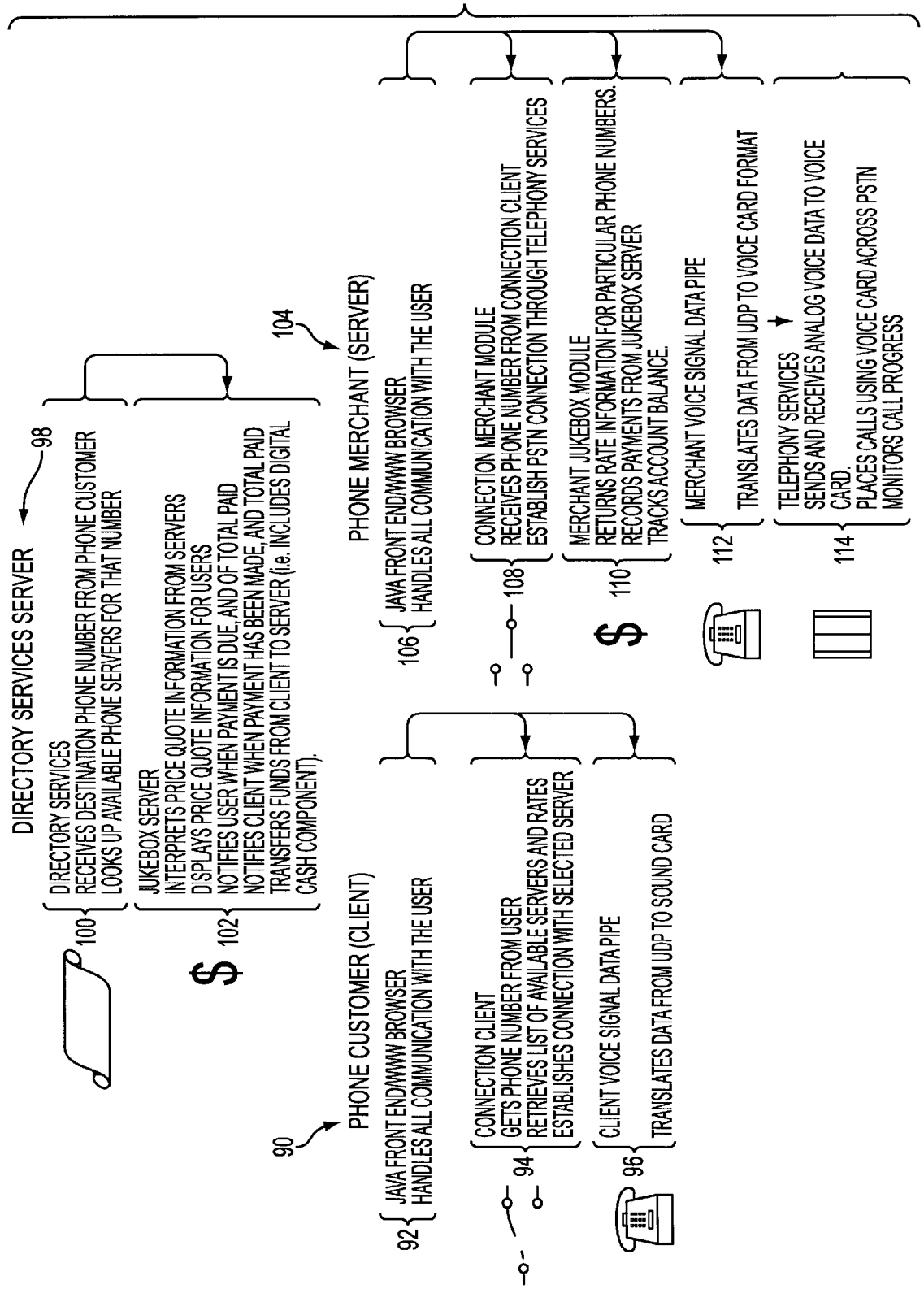

INTERNET TELEPHONY DIRECTORY SERVER

BACKGROUND OF THE INVENTION

1. Field of the Invention

The invention relates to an Internet communications system, and more particularly relates to a system that manages the transport of voice over the Internet.

2. Description of the Background

A "call" occurs when two or more parties communicate or exchange information using telephony equipment. The large installed base of personal and office computers and the recent explosion of Internet use has expanded the universe of telephony equipment beyond the conventional telephone system.

With conventional telephony, a telephone set is used to originate and receive telephone calls. The telephone set is connected to a central office exchange that contains switching equipment, signaling equipment and batteries that supply direct current to operate the telephone. When the handset of the telephone is resting in its cradle, the weight of the handset holds the switchhook buttons down. The circuit between the telephone handset and the central office exchange is open. This is called the on-hook condition. When the handset is removed from its cradle, the spring-loaded buttons come up and the switchhook closes. This completes the circuit to the central office exchange and current flows in the circuit. This is called the off-hook condition. The off-hook signal tells the central office exchange that someone wants to make a call. The central office exchange returns a dial tone to the calling phone to let the caller know that the exchange is ready to accept a telephone number. The telephone set sends the telephone number by dial pulses if it has a rotary dial or by audio tones if it has a push-button keypad.

The central office exchange has various switches and relays that automatically connect the calling and called phones. If the called phone handset is off-hook when the connection is attempted, a busy tone generated by the central office exchange is returned to the calling phone. Otherwise, a ringing signal is sent to the called phone to alert the called party that a call is waiting. At the same time, a ringback tone is returned to the calling phone to indicate that the called phone is ringing.

When the called party removes the handset in response to a ring, the loop to that phone is completed by its closed switchhook and loop current flows through the called telephone. The central office exchange then removes the ringing signal and the ringback tone from the circuit.

The part of the telephone into which a person talks is called the transmitter. It converts speech (acoustical energy) into variations in an electric current (electrical energy) by varying or modulating the loop current in accordance with the speech of the talker. The part of the telephone that converts the electric current variations into sound that a person can hear is called the receiver. The signal produced by the transmitter is carried by the loop current variations to the receiver of the called party.

The call is ended when either party hangs up the handset. The on-hook signal tells the central office to release the line connections.

Thus far, the discussion of connecting two telephones together has been limited to local loops and a central office exchange. Most central office exchanges can handle up to 10,000 telephones. To connect more than 10,000 phones, or to connect phones in different cities, states or countries, a complex network of many telephone exchanges is used. It is called the Public Switched Telephone Network (PSTN). The PSTN operates under a hierarchy tree, which efficiently routes the calls. Telephone exchanges exist in the network hierarchy, in which the first four classes are usually for long distance switching, and the fifth class is for connection to the subscription telephones. The PSTN attempts to make connections at the lowest possible level, and therefore the shortest path. If the lines are busy, trunk groups at the next highest level are used.

Under the conventional telephony scheme, calling parties do not pay in advance or in real-time for the calls that originate from their telephone set. Rather, a telephone subscriber receives a bill, typically on a monthly basis, from the telephone company servicing that subscriber's calling area that lists the calls made during the prior billing period and the charges for each call. The subscriber is then required to provide the telephone company with the appropriate payment, typically by a check sent through the mail. A subscriber may also use a calling card, in which the subscriber is assigned a personal account number. The call is then billed to that account number. This enables a calling party to bypass the typical payment scheme for calls made at a remote location, such as a pay telephone. Calls made using a calling card are also accounted for in the subscriber's monthly bill from the telephone company.

Recently, there have been attempts to provide an alternative to conventional telephony means for initiating calls, routing and connecting calls, and payment. These attempts have been in the field of Internet telephony, which is the transmission of voice over the Internet. Voice includes voiceband-modulated data, facsimile signals and human speech. Internet telephony typically uses the Internet as an alternative to the PSTN to carry voice communications. This allows a conversation to occur from computer to computer, rather than from telephone to telephone. By exchanging voice packets in real-time, users may conduct inexpensive conversations over standard Internet connections. Presently available Internet telephony applications, however, are limited in that they provide services only to a small community of users and thus do not provide a viable alternative to the long-distance providers of the PSTN. For example, current systems require both the calling party and the receiving party to be equipped with multimedia personal computers (PCs) (i.e., PCs having a microphone, capable speakers, and a soundcard) and to be on-line at the same time so that the "connection" may be made through the server. Since calls can only be made from one computer to another, users must prearrange calls or they must always leave their Internet telephony application running on their PC. Existing systems fail to provide a mechanism for contacting a non-connected party, i.e., "ring" the non-connected party's telephone line. The community of available receiving parties is further limited by the fact that currently available software packages are generally incompatible. Existing systems also require the calling party to know the intermediary server's IP address in order to have a telephonic conversation over the Internet. Moreover, users are not provided with the opportunity to select among a plurality of servers that may be willing to handle the call.

SUMMARY OF THE INVENTION

It is therefore an object of the invention to overcome these and other drawbacks of the prior art and to provide transport of voice over a public network, such as the Internet, between two or more terminal devices.

It is another object of the invention to allow the calling party to initiate a communication from the calling party's computer directly to a Plain Old Telephone Service (POTS) telephone so that the telephone rings and the receiving party is notified that a call is waiting.

It is another object of the invention to allow a calling party to initiate an Internet call from the calling party's own POTS telephone.

It is another object of the invention to allow a calling party to make a decision as to which service, of presently available telephony services, to use during the call.

One embodiment of the invention is directed to an Internet telephony system that transports voice from one terminal device to another. The terminal devices may be computers, POTS telephones or other similar communication devices. The calling party inputs the receiving party's telephone number and selects a method of payment. The calling party also chooses the telephony server the calling party desires to connect the call. An Internet connection is then made linking the calling party to the telephony server, which then connects the call to the PSTN and then to the receiving party's standard telephone set.

Another embodiment of the invention is directed to an Internet telephony system in which a directory server solicits rate quotes from a plurality of telephony servers that may be willing to handle the call. The directory server provides the calling party with the rate quotes, and the calling party selects a telephony server.

Another embodiment of the invention is directed to an Internet telephony system that allows a calling party to pay for the call in advance. The payment scheme is a basic payment model, in which the telephony server receives payment from the calling party in the form of digital cash or a credit card number. Once the telephony server receives the initial prepayment, the call is connected.

Another embodiment of the invention is directed to an Internet telephony system that uses a secure payment model. The directory server functions as a proxy for payment and assures the telephony server that payment will be made for the call. The directory server generates digitally signed and encrypted payment tokens. The client software and the telephony server decrypt the tokens and verify the signatures. Once the telephony server verifies the validity of the tokens, the call is connected.

Another embodiment of the invention is directed to an Internet telephony system for monitoring the progress of the call and determining whether additional payment is required. This embodiment may operate under any payment mechanism, including basic and secure payment models. Under the former, the telephony server requests payment from the calling party at regular intervals. Under the latter, if the funds supplied by the payment token begin to run low, the telephony server requests the issuance of a new payment token.

Another embodiment of the invention is directed to an Internet telephony system that allows the user to select from a plurality of payment mechanisms, including digital calling cards and other evolving technologies in electronic commerce, such as smart cards.

Another embodiment of the invention is directed to an Internet telephony system that includes a database comprised of a plurality of telephony servers registered to connect calls to standard telephones. The directory server accesses the database to determine which telephony servers may be willing to handle the call. An on-line registration service may be provided so that telephony servers can register their name and services over the World Wide Web.

Another embodiment of the invention is directed to an electronic messaging system that includes Internet telephony.

Other objects, advantages and embodiments of the invention are set forth in part in the description which follows, and in part will be apparent from this description or may be learned from practice of the invention.

BRIEF DESCRIPTION OF THE DRAWINGS

FIG. 4 is a diagram illustrating the software architecture of the present invention.

DESCRIPTION OF THE PREFERRED EMBODIMENTS

Figure 1:
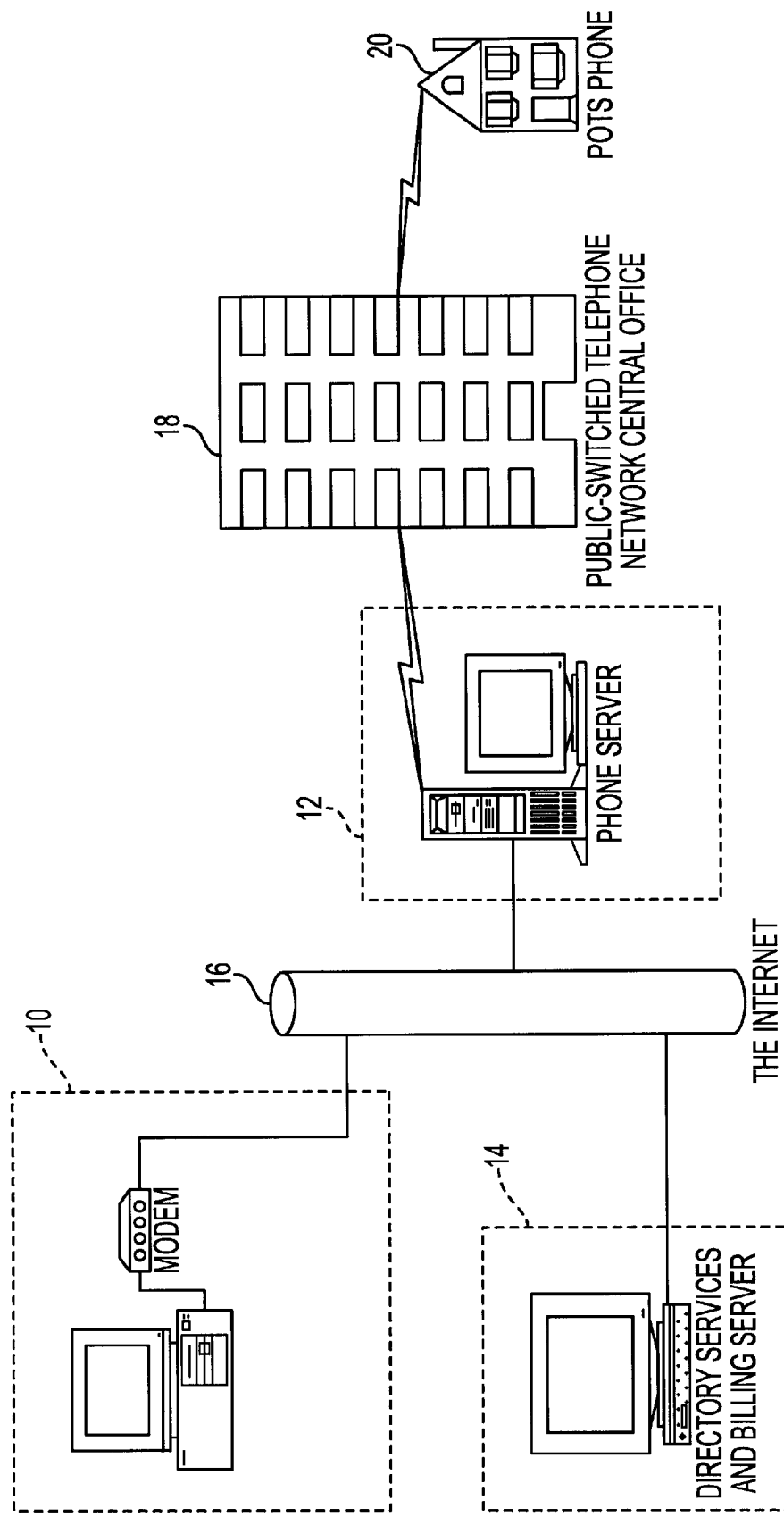
FIG. 1 is a diagram illustrating the hardware components of the present invention.

A preferred embodiment of the invention is illustrated in FIG. 1. The invention is generally comprised of client services 10, telephony services 12 and directory services 14. This general division into three services does not necessarily dictate the distribution of these entities across computers or physical locations. For example, the directory services and telephony services may reside on a single subsystem.

The client services 10, telephony services 12 and directory services 14 are preferably linked via a public network, such as the Internet 16. Client services 10, which include terminal devices and client software, are responsible for interaction with users placing calls. Telephony services 12 handle rate quotes, call initiation and voice data exchange with initiating clients. Telephony services 12 include telephony servers, which serve as gateways that perform the translation between Internet compressed voice packets and conventional analog telephone signals. Each telephony server completes calls to standard telephone numbers within a specified area: local exchange, city, area code, state, country, etc. Directory services 14 use a centralized, replicated database to bridge the gap between users and telephony services. Directory services 14 identify appropriate telephony servers for completing call requests from users and store information regarding the call. The telephony servers are linked to the PSTN 18, which is connected to one or more receiving party POTS telephones 20.

Figure 2:
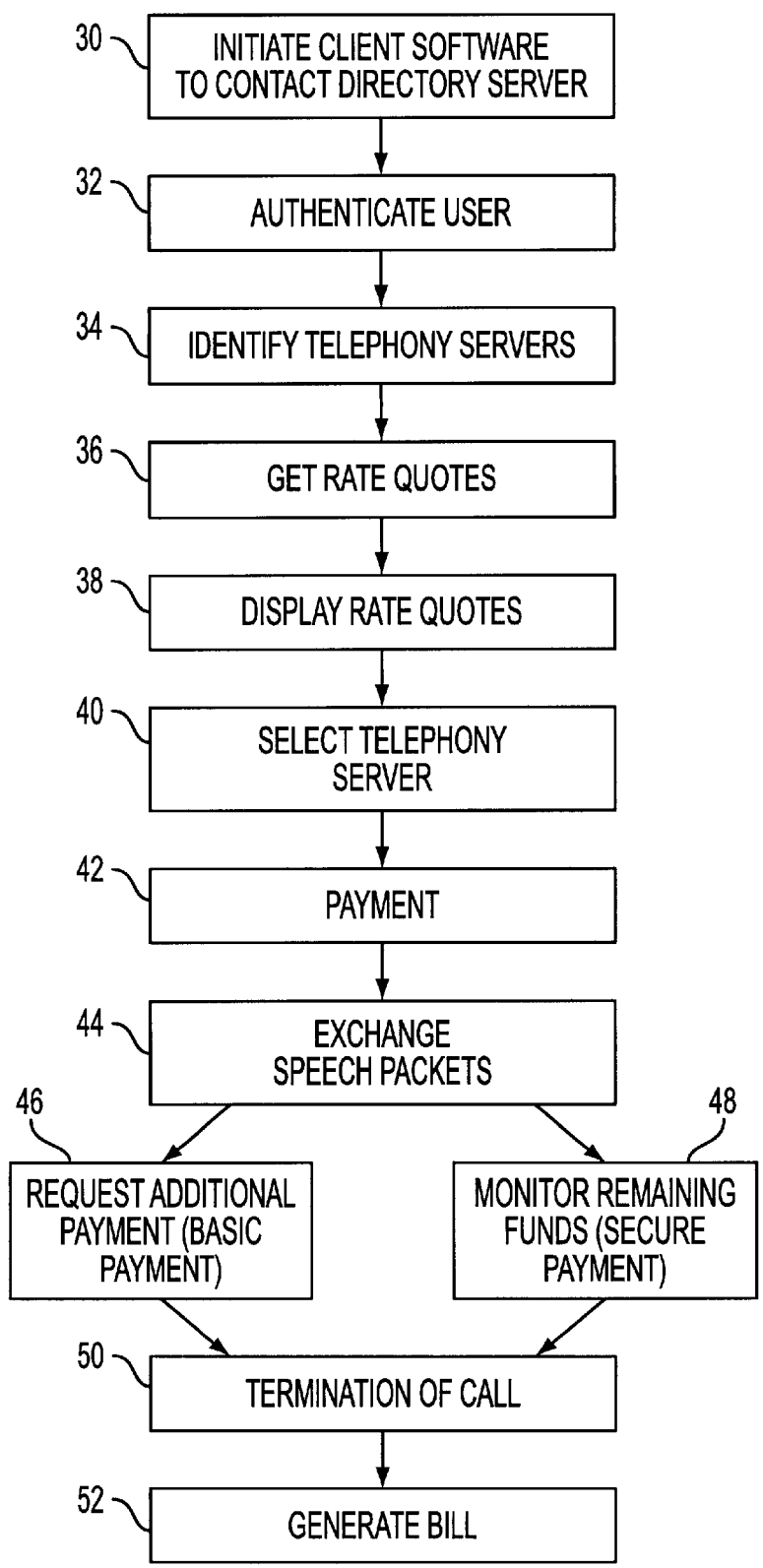
FIG. 2 is a flow chart diagram of the steps used in establishing a call according to a preferred embodiment of the present invention.

According to a preferred embodiment of the invention, a user makes a telephone call by performing the following steps, as illustrated in the flow chart of FIG. 2. First, the user connects to his Internet service provider (ISP), starts the client software and indicates his desire to start a call by using the graphic user interface (GUI) 30. The client software then contacts the directory server. The client software does not need instructions from the user as to how to find a directory server. Rather, the client has a list of one or more directory servers that can be contacted. The client software may use any means to choose between directory server machines. For example, the list of directory servers may be in HyperText Markup Language (HTML) with a browser interface. Alternatively, the selection of a directory server may be done through Java.

Next, the user is authenticated 32. The user provides identifying information (such as user's name and ID) and the telephone number of the receiving party. The user also selects any available payment mechanism. If a basic payment model is employed, the user may choose between prepayment using either electronic cash or credit cards. If a secure payment model is employed, the user may choose between tokens representing either digital cash or a credit card. If the user opts to use a credit card, the user must provide the client software with his credit card number. The client software packages and sends the identifying information, receiving party's telephone number and method of payment to the directory server. The identifying information may be omitted for anonymous calls. The directory server acts as a broker, providing the user with quotes from the telephony servers who are willing to handle the call. Particular details of authorization and acceptable payment mechanisms can be determined by individual directory server systems. However, a directory server must not allow a conversation to occur if a payment mechanism has not been identified. The directory server issues a unique identification number to each conversation. This number is issued at the time of the initial request, and is used throughout the duration of the conversation. The directory server creates a record for the conversation in a conversation database.

The third step is for the directory server to identify telephony servers that might be willing to handle the call 34. Each directory server has a list of telephony servers that it might contact. The list of telephony server names can be added, deleted or changed through a Telephony Server Registration Service. The directory server can use any appropriate mechanism for internal storage and management of the list of telephony servers. For smaller directory server installations, the list of telephony servers may be a simple text file. For larger operations, database systems may be used to provide faster feedback. A series of replicated directory server systems may be operated in order to provide reliability in case of failure, and provide adequate performance in case of high demand.

Each telephony server is identified by a name, Internet protocol (IP) number, description and a list of calling areas that are served by that telephony server. These areas may be as general as country codes or as specific as individual numbers. Each telephony server handles calls for a specific calling area: a single exchange, city, area code, state, etc. By comparing the receiving party's phone number with the areas handled by various telephony servers, the directory server identifies the telephony servers that would be willing to accept the call.

Once the directory server identifies a set of potential telephony servers, it contacts each of them to determine the rate that each telephony server would charge for the call 36. Each telephony server is provided with the phone number and any identifying information of the user. In return, the telephony server (if it opts to process the call) provides the directory server with a quote for the call. For calls originating in the United States, rates are preferably expressed in U.S. dollars/minute. In issuing a quote, the telephony server is committing to connect a call to the given number at a given rate. Calling rates may be dynamically adjusted by telephony servers, based on factors such as load, user identity, time of day, usage patterns and the client. The telephony server rates may be based on criteria other than rate, such as corporate agreements or other factors. Future developments in Internet technology may also present opportunities for additional criteria to be included in rate quotes. For example, the Resource ReSerVation Protocol (RSVP) is a proposed Internet standard for providing guaranteed quality of service. In the presence of RSVP, telephony servers might quote rates based on differing levels of service quality. Alternatively, the level of quality might be specified in the original request.

The rates issued are undeniable: once issued, the telephony server may not disavow the quote. Nevertheless, since telephony server capacity (e.g., lines and processing power) is a finite resource, telephony servers are not obligated to wait indefinitely for users to take advantage of a quote. Each quote therefore comes with a lifetime indication, expressed as the number of minutes that can elapse before the quote will no longer be honored. Quotes are short-term, with lifetimes typically on the order of minutes. Quotes must be renegotiated if they expire. Users cannot "lock-in" quotes for use at some time in the future. If no lines are available, the telephony server can return a rate with a "no lines currently available" flag, allowing the user to consider a currently unavailable server. If the user attempts to start the call after the lifetime has expired, the telephony server is not obligated to complete the call.

Rate quotes may include additional information supplied by the telephony server, such as name, status details, and advertisements, usually in the form of a uniform resource locator (URL). URLs serve as pointers to additional information, thus providing the telephony server with an opportunity to promote specials, advertise add-on services, or provide other information to the user.

The directory server returns quote information to the user's client software, which displays the list of quotes to the user 38. A telephony server may be chosen on criteria other than rate, such as corporate agreements, personal preference or other factors. The user selects a telephony server 40, providing appropriate input to the client software. The client software then contacts the selected telephony server, requesting initiation of a phone call. The client computer also contacts the directory server with the IP number of the chosen server and the unique ID for the conversation.

The next step is payment 42. If the basic payment model (described below) is being used, the client software provides the telephony server with an initial prepayment for the first part of the phone call. For example, the client software may supply the telephony server with the user's credit card number, using a secure protocol such as Secure Electronic Transactions (SET). The telephony server uses this information to generate a request for prepayment for the start of the call. Alternatively, the client may initiate an electronic cash payment for some portion of the first minute of the call. If the secure payment model (described below) is being used, the directory server issues payment tokens, which serve as proof of ability to pay for the call, to the client computer. The client software then provides the telephony server with the payment tokens.

At this point, the telephony server has a call request corresponding to a legitimate quote, along with payment of the start of the call. The telephony server instructs its telephony hardware to begin the process of calling out to the specified public switched telephone network (PSTN) number.

The telephony server provides the user's client software with information regarding initiation and progress of the call. The telephony server may also provide the client with a URL, and if appropriate, the client's World Wide Web (WWW) browser is adjusted to point to this URL. The receiving party is then alerted, or notified, of the appearance of an incoming call by ringing on a POTS network. The user is notified if the phone is ringing, busy, or when the receiving party picks up. If the call cannot be completed, the telephony server refunds any prepaid amounts. Otherwise, the call proceeds, and the user and receiving party can begin talking.

The client software and telephony server exchange digitized speech packets 44. The client software digitizes the user's speech and sends it across the network to the telephony server, where it is appropriately translated and provided to the receiving party over standard telephone lines. The receiving party's speech follows the opposite path. The invention allows for a full duplex conversation, where one can speak and hear the other person at the same time. Multicasting is also possible. This allows one user to send speech packets to several receiving parties for conferencing.

The client software also sends "heartbeat packets" (also called progress packets) to the telephony server. These packets contain the identification number of the conversation, along with an indication of the ongoing length of the call. In the secure payment model, heartbeat packets are encrypted and digitally signed to prevent fraud. The telephony server processes the heartbeat packets by decrypting each packet and verifying the digital signature. If any packets are invalid, the telephony server has the option of terminating the conversation.

If the basic payment model is used, the telephony server every so often requests payment of the next slice of time of the conversation 46. Generally, the telephony server makes requests at a regular rate of 10/minute, or one every six seconds. These requests are filled as appropriate: for example, by credit card transaction or electronic cash transfer. The user does not have to take special action to fulfill these requests, since all of the money-handling is handled by the client software. The client software provides the user with an indication of the amount of time spent on the call and the running cost. If the telephony server's requests for finds are not properly satisfied, the telephony server can terminate the discussion at any point in time. Similarly, if the user notices that the call is becoming too expensive, he can terminate the call at any point in time. The basic payment model thus protects the user, to some extent, from fraudulent behavior on the part of the telephony server, since the user can disconnect if he thinks that the billing rate is incorrect.

With the secure payment model, the client and telephony server both monitor the duration of the call. This information, along with the quote (which determines the rate at which the call is billed) and the payment token (which indicates the funds available for the call), is used to monitor the remaining funds that may be used for the call 48. If funds are in danger of being depleted, the telephony server sends the message to the client software, indicating the need to provide additional funds. Upon receipt of the message, the client software asks the user to provide additional funds. The user may also decide to add additional funds at his own convenience. To add funds, the user must provide new information about means of payment. This authorization request contains the ID of the ongoing conversation so the directory server will know that further rate quotes are not necessary. The directory server sends a new token to the client, which is forwarded to the telephony server. If funds are exhausted, and new funding has not been supplied, the telephony server may terminate the call.

Under either model, the conversation may continue until one of the sides hangs up or appropriate payment is not available 50. The user may employ GUI controls on the user interface software to terminate the call; the receiving party may simply hang-up his handset to end the call. Once the call is terminated, the user's client software will reset, allowing the user to make another call, if desired.

Upon termination of the call under the secure payment model, the telephony server encrypts and signs the last heartbeat packet sent from the client. It is sent to a Payment Manager, constituting a bill for the call. The bill need not be sent immediately after the conversation ends. It may be sent at any time in the future. This flexibility is necessary for handling of server crashes.

The directory server generates the bill for the call 52. The bill may include the ID of the user, the telephony server name/ID, the PSTN destination number, the rate for the call, the length of the call, and the total cost. The bill is sent to the appropriate billing module, which uses information about the user and the telephony server to generate an appropriate bill.

Figure 3:
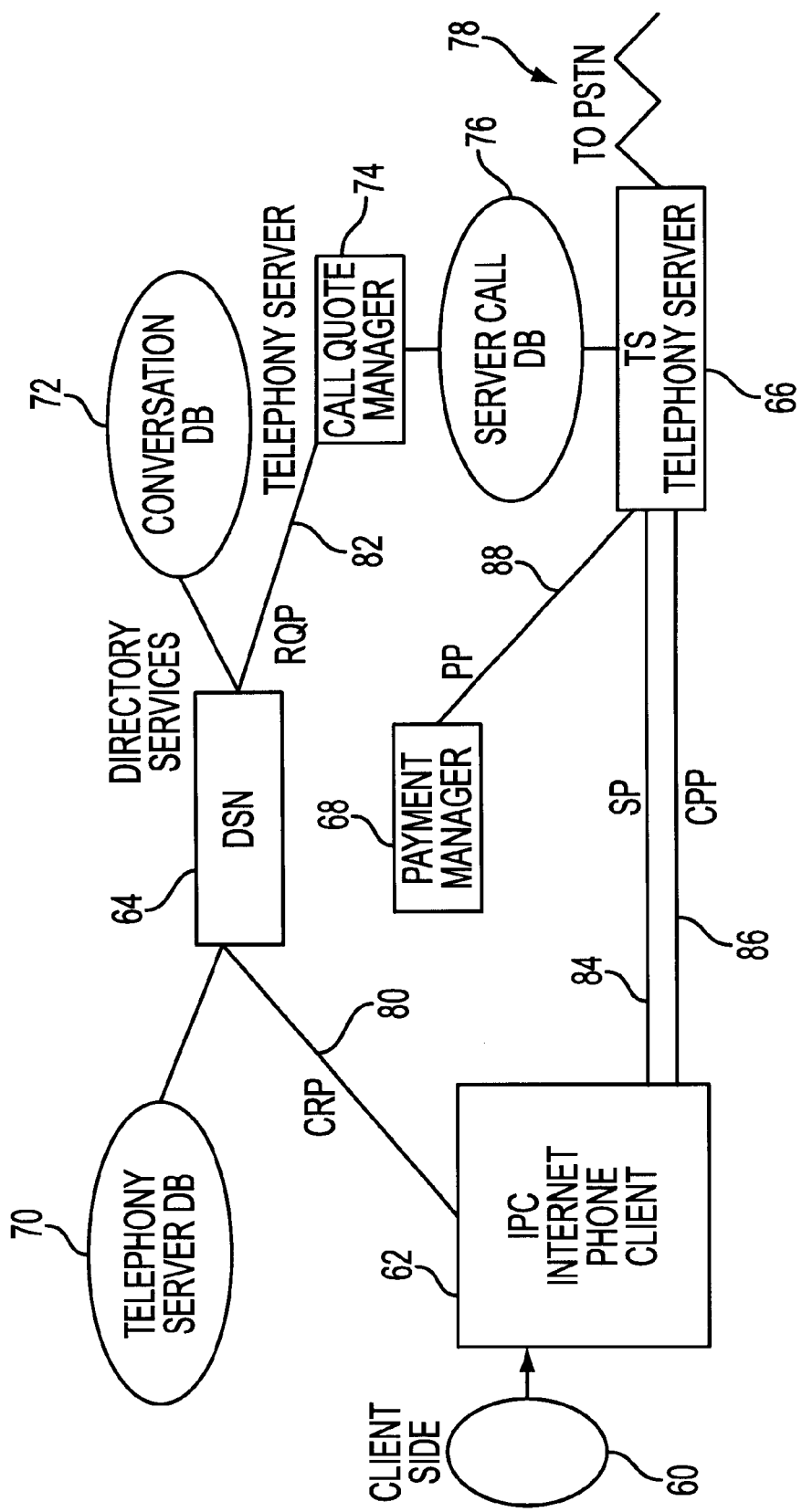
FIG. 3 is a diagram illustrating the communication paths between components of a preferred embodiment of the invention.

The communication paths of a preferred embodiment of the invention are shown in FIG. 3. Client services include terminal devices 60 and client software, also called the Internet Phone Client (IPC) 62. The IPC 62 serves as an interface with the user to achieve selection of a telephony server, selection of payment, reporting of progress of the call, and exchange of voice packets.

The IPC 62 accepts from the user (who is linked to the IPC 62 via a terminal device 60 such as a computer or PSTN) the telephone number of the party the user desires to call. The IPC 62 then communicates with the Directory Services Network (DSN) 64 to identify a list of candidate telephony servers that would be willing to connect the call. It then presents the list of potential telephony servers received from the DSN 64 to the user, accepts a telephony server selection from the user, and tells the DSN 64 which telephony server was selected.

The IPC 62 provides the telephony server with payment, either in the form of payment tokens issued by the DSN 64 (in the case of the secured payment model) or in the form of electronic cash or credit card number (in the case of the basic payment model). The IPC 62 also contacts the selected telephony server, requesting initiation of the conversation.

The IPC 62 accepts and digitizes speech packets from the user. It exchanges digitized speech packets with the Telephony Server (TS) 66 via transmission control protocol/Internet protocol (TCP/IP). The IPC 62 also processes incoming digitized speech packets and plays these packets back to the user.

The IPC 62 exchanges Call Progress packets with the TS 66 and provides the user with feedback regarding the progress of the call initiation, completion and termination. The IPC 62 also records the length of the conversation, and provides the user with any additional information from the DSN 64 and/or the TS 66.

The IPC 62 assumes that the individual users have been authenticated by the DSN 64. This authentication includes establishment of an appropriate payment mechanism. Specific details of the authentication scheme and the payment mechanism are defined at the discretion of the DSN 64.

The directory services of the invention include the DSN 64 and the Payment Manager (PM) 68. The DSN 64 uses a centralized, replicated database (Telephony Server database 70) to bridge the gap between users and telephony servers, and a Conversation database 72 to store information regarding the call.

The Telephony Server database 70 contains entries for each telephony provider that might service calls for the directory server. The entries for each telephony server include name, description, IP address or hostname, and list of area codes served. Area codes are expressed as prefixes, such as "1617" for calls in Eastern Massachusetts.

The Conversation database 72 contains records describing each ongoing or potential conversation. It includes the following fields: user name; user IP/host address; destination phone number; server IP/host address; lifetime of quote; quoted rate; and duration of call. Additional fields may be added. Entries in the Conversation database may be deleted after the conversation has been billed.

The DSN 64 is responsible for matching up phone numbers and callers with appropriate telephony servers. The DSN 64 accepts phone numbers and user IDs from the IPC 62. The DSN 64 generates a unique conversation ID and conversation record in the Conversation database 72. Given a phone number and user ID, the DSN 64 searches the Telephony Server database 70 to identify service providers that might be willing to handle the call. The DSN 64 gets rate quotes from all candidate telephony servers and provides the IPC 62 with a list of servers from which to choose. The DSN 64 accepts notification of server choice from the IPC 62, sends a payment token to the IPC 62 (in the secure payment model), and updates the Conversation database 72 accordingly.

The PM 68 collects billing packets from the TS 66. It uses the billing packets and entries from the Conversation database to generate a bill for the call.

Telephony services are responsible for handling rate quotes, call initiation, and voice data exchange with the initiating clients. Telephony services include the Call Quote Manager (CQM) 74, the TS 66 and the Server Call database 76.

The CQM 74 accepts call requests from the DSN 64, including a destination phone number, user ID, and a conversation ID. Given a user ID and a destination phone number, the CQM 74 identifies a rate quote for the conversation, including the cost and lifetime of the quote. It also creates an entry in the Server Call database 76 corresponding to the rate quote. The CQM then returns the rate quote to the DSN 64.

The TS 66 initiates the call and tracks the progress of the call. It communicates with the telephony hardware and sends/receives outgoing/incoming speech to/from the PSTN 78. It also exchanges digitized voice packets with the IPC 62. The TS accepts call initiation requests and payment from the IPC 62 and updates the Server Call database 76 accordingly. It exchanges Call Progress packets with the IPC 62, thereby informing the IPC 62 of call progress. The TS also sends billing packets to the DSN 64, in the case of secure payment.

The Server Call database 76 is used by the CQM 74 and TS 66 to track details regarding each of the calls that are currently active, or may become active, for the telephony server. The Server Call database 76 contains information including client, phone number, associate DSN IP number, rate quoted, expiration times for the rate, and in the case of secure payment, available funds and billing status (e.g., billed or unbilled).

The call request protocol (CRP) 80 is used by the IPC 62 and TS 66 as an initial component of a phone conversation. The IPC 62 takes a destination phone number and user identification (as provided by the user), and sends the information to the DSN 64. The DSN 64 replies with a list of candidate telephony servers, quotes from those servers, and a unique ID for the conversation. Each quote contains information identifying the Telephony server, a rate for the call, and a lifetime for the quote, indicating the number of minutes for which the quote will be valid. When the user selects a Telephony Server, a CRP message is sent to the DSN 64, indicating the beginning of a conversation. The DSN 64 uses this message to update the Conversation database, and a payment token (if operating under the secure payment model) is sent to IPC 62.

The rate quote protocol (RQP) 82 is used by the DSN 64 and the CQM 74 to exchange quote information. The DSN 64 provides the CQM 74 with a user ID, a destination phone number, and a conversation ID. The CQM 74 either returns a quote for that call, including the information described above (e.g., rate, identification information, expiration time), or refuses to provide a quote. The CQM 74 may refuse, for example, if sufficient lines are not available, or if the telephony server does not wish to provide service to the user.

Speech protocol (SP) 84 is the protocol to be used to exchange digitized speech packets. This protocol is defined by the speech software being used.

Call progress protocol (CPP) 86 is used to send messages between the IPC 62 and the TS 66. This protocol is used to initiate a call, provide the telephony server with payment authorization, indicate progress of call initiation, and update the telephony server regarding the progress of ongoing calls. CPP packets are encrypted and digitally signed in the secure payment model.

Payment protocol (PP) 88 is used by the TS 66 to send payment-related messages to the PM. The TS 66 sends PP packets to the PM 68 at the end of a conversation in order to generate a final bill. Like CPP packets, PP payments in the secure payment model are cryptographically protected.

The software architecture of the present invention, as shown in FIG. 4, includes the client 90, the directory services server 98 and the merchant server 104. The client includes a Java Front End/WWW Browser 92, a Connection Client 94 and a Client Voice Signal Data Pipe 96. The Java Front End/WWW Browser 92 handles communication with the user. The Connection Client 94 obtains the receiving party's phone number from the user, retrieves the list of available telephony servers and their rates, and establishes a connection with the selected telephony server. The Client Voice Signal Data Pipe 96 translates data from UDP to the sound card.

The directory services server 98 includes a Directory Server 100 and a Jukebox Server 102. The Directory Server 100 receives the destination phone number from the user and looks up available telephony servers for that number. The Jukebox Server 102 interprets rate quote information from telephony servers, displays rate quote information for the user, notifies the user when payment is due and of total paid, notifies the client when payment has been made and of total paid, and transfers funds from the client to the telephony server in the case of secured payment.

The merchant server 104 includes a Java Front End/WWW Browser 106, a Connection Merchant Module 108, a Merchant Jukebox Module 110, a Merchant Voice Signal Data Pipe 112 and Telephony Services 114. The Java Front End/WWW Browser 106 handles communication with the user. The Connection Merchant Module 108 receives the destination phone number from the Connection Client 94 and establishes a PSTN connection through Telephony Services 114. The Merchant Jukebox Module 110 returns rate information for particular phone numbers, records payments from the Jukebox Server 102, and tracks the account balance. The Merchant Voice Signal Data Pipe 112 translates data from UDP to voice card format. Telephony Services 114 send and receive analog voice data to the voice card, places calls using the voice card across the PSTN and monitors the call progress.

Each module may communicate directly with its analog on the other computers. For example, the Client Voice Signal Data Pipe 96 may communicate with the Merchant Voice Signal Data Pipe 112. Each module also many communicate with subordinate modules on the same computer. Preferably, no other inter-module communication is permissible.

With respect to the hardware architecture of the present invention, the terminal devices may be a computer, telephone set or other similar communication device. If the terminal device is a computer, it preferably includes a soundblaster, microphone, speakers, modem and Internet connection. Client software, which may be a shrink-wrapped application, resides on the computer and coordinates the conversation, interacting with the user's Internet phone software, WWW browser and Internet connection. Client software also provides user interface controls that, among other things, allow the user to input data and supply the user with a running meter of the call progress.

The telephony servers preferably include a modem, Internet connection and dialogic voice cards. In a preferred embodiment, telephony servers only handle calls that are "local" from the physical location of the server. The system architecture allows telephony servers to provide access to overlapping service areas, providing opportunities for competition between telephony servers.

A network of high-performance directory servers, collectively called the Directory Services Network (DSN), provides the outside world's interface to directory services. The DSN is implemented by a network of replicated computers, with a variety of possible configurations. For example, identification of telephony servers may be handled by a hierarchical database configuration, or by a series of replicated databases. Directory servers act as clients for databases stored on database servers. Using standard client/server models, directory servers query the database servers for information regarding telephony servers appropriate for a given call, status of completed or ongoing calls, or other relevant details. Database servers communicate with the directory servers through dedicated private lines or high-speed, secure Internet connections. In some cases, it may be desirable to have one CPU acting as both directory and database server.

Database servers provide directory servers with fast, reliable access to a large database of telephony servers. Each directory server may be equipped with a local cache to speed access to telephony server descriptions for commonly called areas. The database structure may have features of both distributed and hierarchical database models.

In the distributed database model, the telephony server database is stored in its entirety in a wide variety of sites. Updates and revisions are accomplished through a regular replication process. In the hierarchical database model, servers store progressively larger subsets of the telephony server database. When faced with a request to a calling area not covered by its own local database, a database server forwards the query to other servers in the system until a server with the correct database components is found. This multi-tiered database model uses techniques similar to those used in Internet protocols such as Domain Name System (DNS) and Lightweight Directory Access Protocol (LDAP).

The DSN database architecture is flexible and dynamic. The set of active database servers may change on a regular basis, as new machines come on-line to handle added load, or existing machines cease functioning due to system failure or other problems. The database architecture is designed to accommodate frequent changes and potentially significant growth.

As the primary entry point, directory servers provide users with an effective and responsive view of the system. The DSN provides reliability, speed, flexibility and transparency. Users are able to reliably place calls at any time or place preferably without interruption of service or decline in performance. Problems such as network load, system load, or failure of individual directory servers preferably do not affect performance as seen by the user. Because these servers are subject to service loads that are unpredictable, varied, and uneven, a load-balancing protocol is used to effectively allocate computational resources. Under this scheme, a heavily-loaded directory server can "hand-off" incoming call requests by routing them to other servers that may be underutilized or less busy. This balancing is transparent to the user.

In addition, users preferably receive prompt responses to all requests made to directory servers. While timing for rate quotes is not entirely under the control of the directory servers, the DSN should make every effort to provide rate quotes preferably within five seconds of the original request. Furthermore, because the computers involved in the DSN will be changing on a regular basis, the DSN is flexible in that it can handle addition or deletion of servers seamlessly.

Long-term management of this embodiment of the invention requires accurate understandings of usage patterns and system loads. DSN machines account for this by maintaining activity logs that describe call requests, servers contacted, calls completed, and other relevant system activities. These records may be coordinated and tabulated to provide a comprehensive description of the invention's operations. This analysis may be used to troubleshoot problems and guide system decisions regarding, for example, deployment of directory servers and telephony servers, and loading and plan resource allocation.

Another embodiment of the present invention is directed to an Internet telephony system that uses a basic payment model. The basic payment model involves continuous, real-time payment through transfers of electronic funds or generation of credit card charges. Under the basic payment model, the conversation begins with user authentication, in which the user provides appropriate identifying information to the directory server. This information may include the individual's name or some identification number. Personal information is not necessary, thereby allowing completely anonymous call initiation. If personal information is supplied, the directory server may use it to provide additional services, such as a frequent caller plan. When provided, this information is passed along to the telephony server, which also may provide its own add-ons, including messaging, frequent-use discounts or other extensions.

In addition to providing identifying information, the user selects a payment means, choosing between digital cash and SET credit cards. As part of this request, the client provides the server with information necessary for appropriate transfer of funds. For electronic cash payments, this information is in the form of appropriate pointers to the user's electronic purse. For SET calls, payment information involves the user's encrypted credit card number.

As the call proceeds, the telephony server requests payment from the user at regular intervals, based on the pre-negotiated rate. In general, requests are made at the rate of 10/minute, with each transaction representing a prepayment for the next six seconds. These requests lead to the transfer of digital cash or to the increase of a running credit card bill. Since the server receives payment for six second service increments in advance, the service provider is never providing services without having received proper payment. If payment requests are not properly honored, the telephony server can disconnect the call.

Client software provides the user with a running account of the time and funds spent on the call. Accurate and reliable accounting serves as the basis for generation of bills. Appropriate accounting from both the client system and the terminating server is collected and tabulated in order to provide a confirmed, reliable description of calls in progress. Billing may be divided into three components: authentication (caller identifies himself to the directory server), conversation accounting (as the conversation proceeds, the client provides the server with continuous updates regarding the progress of the call), and payment (appropriate funds are transferred from the client to the telephony server). Billing is flexible to allow for a variety of payment schemes and relationships between entities. The billing components acts as a go-between, working to assure transfer of funds from customer to service provider, through any mutually acceptable payment mechanism. Conventional paper billing is also available.

The user may specify an upper limit on the funds available for the call, and the client software can terminate the call if the maximum is reached. The client software also compares the incoming requests for funds to the negotiated rate. If the server's requests are too frequent, or specify inaccurate amounts, the client software notifies the user, who has the option of terminating the call.

This provides fair billing in most circumstances, with a minimal amount of overhead. Since the user prepays in small intervals, the provider is guaranteed payment for all services provided, while the user is protected against loss of funds if service is not provided. If a call is interrupted while in progress, the user may lose some or all of the most recent payment. This should be the total extent of the user's risk.

A preferred embodiment of the invention uses a secure payment model, in which the directory server functions as a proxy for payment, and encryption and digital signatures are employed to provide greater security. Each directory server is trusted to generate payment tokens only for authorized users who have provided proof of ability to pay for the phone call in question. Forgery of payment packets is prohibitively difficult, since each payment token is encrypted and signed by the directory server.

When the authenticated user selects a telephony server to process the call, the client software sends a message to the directory server. This message is used by the directory server to update the server's call database, and to generate a payment token, which is returned to the client software.

The payment token is a digitally signed and encrypted verification of the existence of sufficient funds for the conversation. The client decrypts and verifies this token, which is then coordinated with the quote information that the client previously received. The client then adds its own signature to the payment token, and re-encrypts it. This token is sent to the appropriate telephony server. Upon receiving the payment token, the server will decrypt it and verify the signatures. If the payment token is valid, the telephony server initiates the call to the destination phone number. If the token is invalid, no further action is necessary.

At this point in time, both the client and telephony server have information sufficient for monitoring the cost of the ongoing conversation: the original rate quote contains the per-minute cost of the phone call, and the payment token indicates the total amount available for the call. As the call progresses, both entities track the elapsed time, and this measurement is used to monitor the ongoing cost of the conversation.

If funds begin to run low, the server sends a message to the client requesting additional payment. Upon receipt of this message, the client asks the user for additional authentication, in a manner similar to that of pay phones ("please insert 25 cents for three more minutes"). If the user provides additional authorization, the client sends a message to the server. The server recognizes this packet as being related to an ongoing conversation, and a new payment token is issued, if the payment information is valid. This packet is sent to the client, who processes it appropriately and forwards it to the server. If the server does not receive a new payment token, the request for additional funds may be repeated. Alternatively, if available funds are used before a new payment token is received, the server can terminate the call.

Variations on this scheme are possible. The end user need not wait for a reauthorization request: additional funds may be provided at any time during the conversation. In conversations based on a billing or credit card model, the payment token need not indicate the cost limit. In such cases, the conversation will simply continue indefinitely.

Throughout the course of the conversation, the client software and the telephony server exchange progress messages. Once the call has started, the client software sends out packets every few seconds (roughly 10/minute). These packets contain the conversation ID number, and the client's value for the amount of time elapsed in the conversation. To prevent fraud, these packets are signed and encrypted.

When the telephony server receives one of these packets, it decrypts and verifies the packet, and the packet's call duration component is compared against the server's internal call duration timer. If the packet cannot be decrypted, the signature cannot be verified, or the duration times do not approximately match, the server can assume that the packet is fraudulent. This may be due to a client actively trying to cheat the system, a third party running a "man-in-the-middle" attack, or some other means. In any case, the telephony server interprets this lack of consistency as an indication that something is wrong, and the call is terminated. Similarly, if the server does not receive a packet within some pre-defined time-out interval, the call is terminated.

If the packet is legitimate, the telephony server creates a corresponding packet to be sent back to the client, which decrypts the packet, verifies the signature, and verifies the call duration value provided by the server. If the packet is in any way incorrect, the client can terminate the call. This protects the client from dishonest telephony servers, which may try to bill at a higher rate than originally claimed. Throughout the conversation, the server maintains a copy of the most recent packet received from the client. This packet eventually is used to generate a bill for the conversation.

Calls can end gracefully or abruptly. A graceful ending occurs when either human participant terminates the call. This indicates to the software (client or server) that the call has ended. If the initiating user closes the conversation, the client sends a final progress packet to the server. If the other conversant hangs up, the server sends a message to the client, requesting a final progress packet. The final progress packet from the client is used to generate the bill.

Abrupt endings occur when system problems prevent graceful endings. Hardware or software crashes on either side of the conversation are the most likely cause. Network failures also may be a cause of abrupt endings. In these cases, the server generates a bill based on the final progress packet that was received from the client. If the abrupt ending is caused by a failure on the server, the bill can be generated at some point in the future.

When the final progress packet has been identified, the server uses this packet to create a payment packet. The progress message is signed and encrypted by the telephony server, and sent to the directory server. The directory server verifies that this packet indicates a legitimate amount of time, and uses its record of the payment and rate for the conversation to determine the amount of funds to be transferred to the server. The directory server then uses the payment information originally provided by the user to generate an appropriate transfer of funds to the server.

Any prepaid funds in excess of the actual cost of the conversation should be returned to the user. Refunds are generally necessary for calls that are either not successfully established (due to busy signal, no answer, or other problem) or do not exhaust all of the available prepaid funds.

Refunds are straightforward for calls that do not use available funds. In these cases, the telephony server presents the Payment Manager of the directory server with a final payment packet. The directory server verifies the legitimacy of this packet, and the appropriate funds are transferred to the telephony server. Any remaining funds are returned to the client software.

If the call is never completed, the telephony server sends a progress packet to the client software, indicating a call of zero duration and zero cost. The client submits this packet to the directory server, using the Call Request Protocol (described below). After verifying the legitimacy of this packet, the directory server returns the funds to the client.

Calls may go uncompleted due to problems with the telephony server. For example, the telephony server may crash while attempting to complete a phone call. In such cases, no progress packets are available (on either side) to generate a payment packet. In this case, the directory server may provide a refund to the user after some appropriate interval. Immediate refunds are not appropriate, since the telephony server may attempt to submit payment tokens after some interval. However, after several hours (or perhaps a full day) have elapsed, the telephony server will have had enough time to submit all payment packets, and any unaccounted for funds should be refunded. Refunds may not be possible for anonymous users, but this should be a relatively rare occurrence.

Given that electronic commerce is a rapidly changing arena, the flexibility of the invention allows it to integrate evolving and new technologies for payment mechanisms to provide Internet telephony services that meet present and future technological demands. For example, payment made be made through devices such as stored value cards, also known as smart cards, which are plastic cards embedded with computer chips. A card reader would be attached to the terminal device to receive the calling party's smart card.

Another embodiment of the invention is to enable PSTN-PSTN calls over TCP/IP networks. These phone-phone calls involve the use of an originating computer running as an IVR system. Users call the originating phone, using dual tone multifrequency (DTMF) signals to provide the terminating phone number and payment information. Once provided with this information, the originating system proceeds to conduct a conversation in the manner described above.

The human user negotiates authentication and payment with the computer responsible for the call. Once the initiating computer has authenticated and verified the calling party, it has payment information and, optionally, the calling party's identity. At this point, the originating computer authenticates itself with a directory server, as if the human user were using the originating computer directly, and the call is placed.

Rate quotes may be solicited and provided to the calling party. The calling party is then provided with a list of candidate telephony servers (or, if appropriate, candidate originating computers). The calling party may choose the entity with the lowest rate quote or other criteria. The user prompts may be responded to via DTMF, voice recognition dialogs, or other similar prompting means. Upon completion of the call, the user periodically may be provided with information regarding progress of the call.

PSTN—PSTN originating computers have telephony hardware similar to that which is found in the telephony servers. As a result, it may be possible to have systems acting as PSTN originators and telephony servers.

Another embodiment of the invention allows telephony servers to be operated by independent third parties. Under this model, the directory server collects a commission on all calls placed, as payment for the brokerage services performed in referring the call to the telephony server. Management of payments to the directory server requires an additional message sent from the client to the directory server at the end of the call. This message describes the total cost of the call, providing the directory server with sufficient information to request a commission payment from the telephony server. The telephony server may refuse to honor the commission payment request. When this happens, the directory server has the option of refusing to handle future calls to this telephony server. The directory server holds the payment in escrow, and payments are made from this fund at the end of the call, based on messages that indicate the total cost of the call. The directory server can use this information to calculate the commission owned. For calls placed with digital cash, the commission can be subtracted directly from the payment made to the telephony server. For calls handled on a credit card basis, the directory server will generate a credit card request for the appropriate commission, while the telephony server can request payment for the remainder of the call.

Another embodiment of the invention allows users to place calls from locations other than their own personal computer. Directory servers provide "digital calling card" services, allowing users to draw on a prepaid pool of funds for making phone calls. As with conventional calling cards, digital calling cards are prepurchased and based on unique identification numbers. User authentication includes presentation of the appropriate digital calling card numbers, which are validated by the directory server. Callers using this scheme prepay for a certain amount of service, to be registered with the directory servers.

When a calling card customer initiates a call, and upon receipt of the calling card information, the directory server transfers some funds (the unused portion of the prepaid amount) to a temporary electronic wallet on the machine being used. These funds are used for the phone call (i.e., provided to the telephony server as appropriate). At the end of the call, any remaining funds are returned to the directory server.

Another embodiment of the invention is to have the telephony servers provide digital calling card services. In this case, user identification supplied by the user provides the telephony server with notification that real-time bills should not be generated, and the telephony server can generate bills according to its own accounting policies.

Another embodiment of the invention is to provide a calling card registration service. Directory servers manage additional databases containing user calling card registration information. Users wishing to use digital calling cards may use an external (WWW or conventional phone/mail) interface to purchase an amount of service from the directory server. To make calls, the user provides the directory server with appropriate identification, and the directory server manages all payment for the call, including deduction of the cost of the call from the user's calling card balance.

Another embodiment of the invention employs encrypted conversations. Since conversations are sent across the Internet in digitized voice packets, they are vulnerable to interception and decoding by Internet snoops. For individuals desiring greater privacy, the invention provides facilities for encrypted conversations using, for example, a secure socket layer (SSL).

Another embodiment of the invention provides an Internet telephony system that serves as a gateway into a variety of information sources and value added services. For example, the invention may serve as a link to a wide range of additional telecommunications services, including messaging, call forwarding, call waiting, teleconferencing, multi-party calling, one-mailbox (universal in-box) systems, paging and information servers, such as Notes databases. Textual and graphical communications may also be integrated with the transport of voice through the use of whiteboards and other similar mechanisms. While some of these services may be provided by the telephony servers, others may be managed by directory servers. The invention may be seen by users as a "one-stop" system for comprehensive delivery of telecommunication services.

Another embodiment of the invention provides a telephony registration service. As the invention is used over a period of time, new telephony servers may come on-line, existing servers may cease operations, and calling areas for telephony servers may change. The DSN serves as a central point for registering any changes regarding telephony server location, configuration, service area, management, or other similar features. This management is reliable, fast and automated. An on-line mechanism, such as a secure WWW server, may also provide a user interface to registration services, allowing telephony service providers to modify their configurations on-the-fly with little overhead.

Other embodiments and uses of the invention will be apparent to those skilled in the art from consideration of the specification and practice of the invention disclosed herein. The specification and examples should be considered exemplary only with the true scope and spirit of the invention indicated by the following claims.

We claim:

1. An Internet telephony system, comprising:
  user input means for allowing a user to input data, the data including a destination telephone number of a receiving party;
  identifying means for identifying a plurality of candidate telephony servers from a telephony server list, wherein each of the candidate telephony servers provides service to one or more receiving parties based on predetermined criteria;
  telephony server selection means for allowing the user to select one of the candidate telephony servers; and
  call initiation means responsive to the telephony server selection means for requesting the selected candidate telephony server to connect a call to the destination telephone number.

2. An Internet telephony system according to claim 1, further comprising:
  quote request means for requesting rate quotes from the candidate telephony servers based on the data;
  quote receiving means for receiving the rate quotes from candidate telephony servers responding to the quote request means; and
  quote displaying means for displaying to the user the rate quotes of the responding candidate telephony servers.

3. An Internet telephony system according to claim 2, wherein the rate quotes include a quote for an unavailable telephone line.

4. An Internet telephony system according to claim 2, wherein each of the rate quotes includes a lifetime indication of the time period in which the rate quote will be honored.

5. An Internet telephony system according to claim 2, wherein at least one of the rate quotes includes additional candidate telephony server information.

6. An Internet telephony system according to claim 5, wherein the additional candidate telephony server information includes advertising.

7. An Internet telephony system according to claim 1, further comprising payment selection means for allowing a user to select a payment method.

8. An Internet telephony system according to claim 1, further comprising payment means for providing payment to the selected candidate telephony server.

9. An Internet telephony system according to claim 8, wherein the payment includes an initial prepayment for the beginning of the call.

10. An Internet telephony system according to claim 9, wherein the payment further includes a plurality of additional prepayments.

11. An Internet telephony system according to claim 8, wherein the selected candidate telephony server periodically requests for an additional payment.

12. An Internet telephony system according to claim 8, wherein the payment includes a payment token, wherein the payment token serves as proof of ability to pay for the call.

13. An Internet telephony system according to claim 12, wherein the payment token includes security features.

14. An Internet telephony system according to claim 13, wherein the security features include encryption and digital signatures.

15. An Internet telephony system according to claim 14, further comprising means for decrypting and verifying the payment token.

16. An Internet telephony system according to claim 8, wherein the payment comprises funds from a digital calling card.

17. An Internet telephony system according to claim 16, further comprising means for registering the digital calling card.

18. An Internet telephony system according to claim 1, further comprising means for generating a bill.

19. An Internet telephony system according to claim 1, further comprising progress means for providing the user with progress data.

20. An Internet telephony system according to claim 1, further comprising progress exchange means for exchanging progress data packets with the selected candidate telephony server.

21. An Internet telephony system according to claim 20, wherein the progress data packets include security features.

22. An Internet telephony system according to claim 21, wherein the security features include encryption and digital signatures.

23. An Internet telephony system according to claim 22, further comprising means for decrypting and verifying the progress data packets.

24. An Internet telephony system according to claim 1, further comprising exchange means for exchanging digitized speech packets with the selected candidate telephony server.

25. An Internet telephony system according to claim 24, wherein the digitized speech packets are encrypted.

26. An Internet telephony system according to claim 1, further comprising termination means for allowing the user, the receiving party or the selected candidate telephony server to terminate the call.

27. An Internet telephony system according to claim 1, wherein the telephony server list is a database.

28. An Internet telephony system according to claim 1, further comprising registering means for registering telephony server data with the telephony server list.

29. An Internet telephony system according to claim 28, wherein the registering means includes an on-line service.

30. An Internet telephony system according to claim 1, further comprising means for accessing information sources and additional telecommunications services.

31. An internet telephony system, comprising:
    a client that enables a user to input data, including a destination telephone number of a receiving party;
    a telephony server identifier that enables identification of at least one candidate telephony server providing service to one or more receiving parties based upon predetermined criteria;
    a telephony server selector that enables a user to select at least one of the at least one candidate telephony servers; and
    a call initiator, responsive to the telephony server selector, that enables the selected at least one candidate telephony server to connect a call to the destination telephone number.

32. An Internet telephony system according to claim 31, further comprising a payment object that provides payment to the selected at least one candidate telephony server.

33. An Internet telephony system according to claim 31, further comprising an exchanger that exchanges digitized speech packets with the selected at least one candidate telephony server.

34. An Internet telephony system according to claim 31, further comprising, a progress indicator that provides the user with progress data.

35. An Internet telephony system according to claim 31, further comprising a terminator that enables the user, the one or more receiving parties, or the selected at least on candidate telephony server to terminate the call.

36. An Internet telephony system according to claim 31, wherein the data is in the form of dual tone multifrequency signals.

37. A method for providing Internet telephony service, comprising the steps of:
    allowing a user to input data, the data including a destination telephone number of a receiving party;
    identifying a plurality of candidate telephony servers from a telephony server list, wherein each of the candidate telephony servers provides service to one or more receiving parties based on predetermined criteria;
    allowing the user to select one of the candidate telephony servers; and
    requesting the selected candidate telephony server to connect a call to the destination telephone number.

38. A method for providing Internet telephony service according to claim 37, further comprising the steps of:
    requesting rate quotes from the candidate telephony servers based on the data;
    receiving the rate quotes from candidate telephony servers responding to the quote request means; and
    displaying to the user the rate quotes of the responding candidate telephony servers.

39. A method for providing Internet telephony service according to claim 38, wherein each of the rate quotes includes a lifetime indication of the time period in which the rate quote will be honored.

40. A method for providing Internet telephony service according to claim 37, further comprising the step of allowing a user to select a payment method.

41. A method for providing Internet telephony service according to claim 37, further comprising the step of providing payment to the selected candidate telephony server.

42. A method for providing Internet telephony service according to claim 41, wherein the payment includes an initial prepayment for the beginning of the call.

43. A method for providing Internet telephony service according to claim 42, wherein the payment further includes a plurality of additional prepayments.

44. A method for providing Internet telephony service according to claim 41, wherein the selected candidate telephony server periodically requests for an additional payment.

45. A method for providing Internet telephony service according to claim 37, further comprising the step of providing the user with progress data.

46. A method for providing Internet telephony service according to claim 37, further comprising the step of exchanging progress data packets with the selected candidate telephony server.

47. A method for providing Internet telephony service according to claim 46, wherein the progress data packets include security features.

48. A method for providing Internet telephony service according to claim 37, further comprising the step of exchanging digitized speech packets with the selected candidate telephony server.

49. A method for providing Internet telephony service according to claim 37, wherein the telephony server list is a database.

50. A method for providing Internet telephony service according to claim 37, further comprising the step of registering telephony server data with the telephony server list.

51. A method for providing Internet telephony service according to claim 37, further comprising the step of accessing information sources and additional telecommunications services.

52. An electronic storage medium having code embodied thereon for causing at least one processor to enable an Internet telephony system, the medium comprising:

client user input code that enables a user to input data, including a destination telephone number of a receiving party;

telephony server identifier code that enables identification of at least one candidate telephony server providing service to one or more receiving parties based upon predetermined criteria;

telephony server selector code that enables a user to select at least one of the at least one candidate telephony servers; and call initiator code, responsive to the telephony server selector code, that enables the selected at least one candidate telephony server to connect a call to the destination telephone number.

53. An electronic storage medium according to claim 52, further comprising payment provider code that enables the provision of payment to the selected at least one candidate telephony server.

54. An electronic storage medium according to claim 52, further comprising exhanger code that enables exchanging digitized speech packets with the selected at least one candidate telephony server.

55. An electronic storage medium according to claim 52, further comprising progress code that enables the provision of progress data.

* * * * *